(12) United States Patent
Allié et al.

(10) Patent No.: US 8,127,045 B2
(45) Date of Patent: Feb. 28, 2012

(54) DYNAMICALLY CONFIGURABLE CONNECTION ON DEMAND

(75) Inventors: Christophe Allié, Sunnyvale, CA (US); Howard Ridenour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 872 days.

(21) Appl. No.: 10/940,225

(22) Filed: Sep. 13, 2004

(65) Prior Publication Data

US 2006/0080673 A1  Apr. 13, 2006

(51) Int. Cl.
*G06F 15/173* (2006.01)
*H04L 12/28* (2006.01)

(52) U.S. Cl. .................. 709/250; 709/238; 370/254

(58) Field of Classification Search .................. 709/250, 709/238; 370/254
See application file for complete search history.

(56) References Cited

U.S. PATENT DOCUMENTS

| | | | | |
|---|---|---|---|---|
| 6,038,611 | A * | 3/2000 | Masel | 719/328 |
| 6,049,832 | A * | 4/2000 | Brim et al. | 709/237 |
| 6,463,078 | B1 | 10/2002 | Engstrom et al. | |
| 6,671,728 | B1 | 12/2003 | Mayberry | |
| 6,711,141 | B1 | 3/2004 | Rinne et al. | |
| 6,714,990 | B1 * | 3/2004 | Autio et al. | 709/250 |
| 6,789,131 | B1 * | 9/2004 | Johnson et al. | 709/250 |
| 7,031,267 | B2 * | 4/2006 | Krumel | 370/255 |
| 7,107,360 | B1 * | 9/2006 | Phadnis et al. | 709/250 |
| 7,224,775 | B1 * | 5/2007 | Shaffer et al. | 379/88.16 |
| RE40,187 | E * | 3/2008 | Abraham et al. | 709/224 |
| 7,437,457 | B1 * | 10/2008 | Eisendrath et al. | 709/225 |
| 7,814,179 | B2 | 10/2010 | Shen et al. | |
| 2002/0196796 | A1 * | 12/2002 | Ambe et al. | 370/401 |
| 2004/0128399 | A1 * | 7/2004 | Kurrasch | 709/250 |
| 2004/0177141 | A1 * | 9/2004 | Foody et al. | 709/224 |
| 2004/0186918 | A1 * | 9/2004 | Lonnfors et al. | 709/250 |
| 2005/0060425 | A1 * | 3/2005 | Yeh et al. | 709/232 |
| 2005/0101306 | A1 * | 5/2005 | Zabawskyj et al. | 455/414.1 |
| 2005/0246443 | A1 * | 11/2005 | Yao et al. | 709/227 |
| 2006/0015618 | A1 * | 1/2006 | Freimuth et al. | 709/226 |
| 2006/0015651 | A1 * | 1/2006 | Freimuth et al. | 709/250 |
| 2006/0031524 | A1 * | 2/2006 | Freimuth et al. | 709/227 |

FOREIGN PATENT DOCUMENTS

| | | |
|---|---|---|
| EP | 0770958 | 5/1997 |
| WO | WO 03/067447 | * 8/2003 |
| WO | WO-03103250 | 12/2003 |

OTHER PUBLICATIONS

Cisco Systems, Inc., "Introduction", © 1992-2007, available at http://www.cisco.com/en/US/products/sw/secursw/ps2308/, 2 pages, (2002 for at least some content).
Cisco Systems, Inc., "Data Sheets", © 1992-2007, available at http://www.cisco.com/en/US/products/sw/secursw/ps2308/products_data_sheets_list.html, 7 pages, (2002 for at least some content).
Cisco Systems, Inc., "General Information", © 1992-2007, available at http://www.cisco.com/en/US/products/sw/secursw/ps2308/tsd_products_support_general_information.html, 2 pages, (2002 for at least some content).
Cisco Systems, Inc., "Bulletins", © 1992-2007, available at http://www.cisco.com/en/US/products/sw/secursw/ps2308/prod_bulletins_list.html, 3 pages, (2002 for at least some content).

* cited by examiner

*Primary Examiner* — Ranodhi Serrao
*Assistant Examiner* — Thomas Richardson
(74) *Attorney, Agent, or Firm* — Blakely, Sokoloff, Taylor & Zafman LLP

(57) ABSTRACT

Mechanisms to provide functionality that allows an electronic device to automatically use an appropriate network connection when an application requests access to a network resource. Initiation of the appropriate network connection may be determined based on contextual information provided by the application.

42 Claims, 4 Drawing Sheets

DYNAMICALLY CONFIGURABLE CONNECTION ON DEMAND

TECHNICAL FIELD

Embodiments of the invention relate to network communications. More particularly, embodiments of the invention relate to techniques for managing network connections.

BACKGROUND

Network connections for an electronic device (e.g., computer system, personal digital assistant, set top box) are requested in many situations. For example, a user may wish to check for electronic mail messages, an electronic mail application may automatically check for electronic mail messages, an application may automatically check for updates, a user may access a public page via the World Wide Web, or the user may access a private page via the World Wide Web. Each of these actions involving a network connection may have different characteristics.

Unfortunately, this may result in, for example, an electronic mail application initiating a virtual private network (VPN) connection periodically for background fetch operations, which may require active participation by a computer user. This results in less than optimal network interaction, which may be frustrating and/or distracting to a user of the electronic device.

SUMMARY

A network access request having context information may be generated by an application running on a host electronic system. The network access request may be passed to a system agent configured to service multiple applications running on the host electronic system. The system agent may determine whether to initiate a network connection in response to the network access request based on the context information. The network connection is selectively initiated based, at least in part, on the determining by the system agent.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
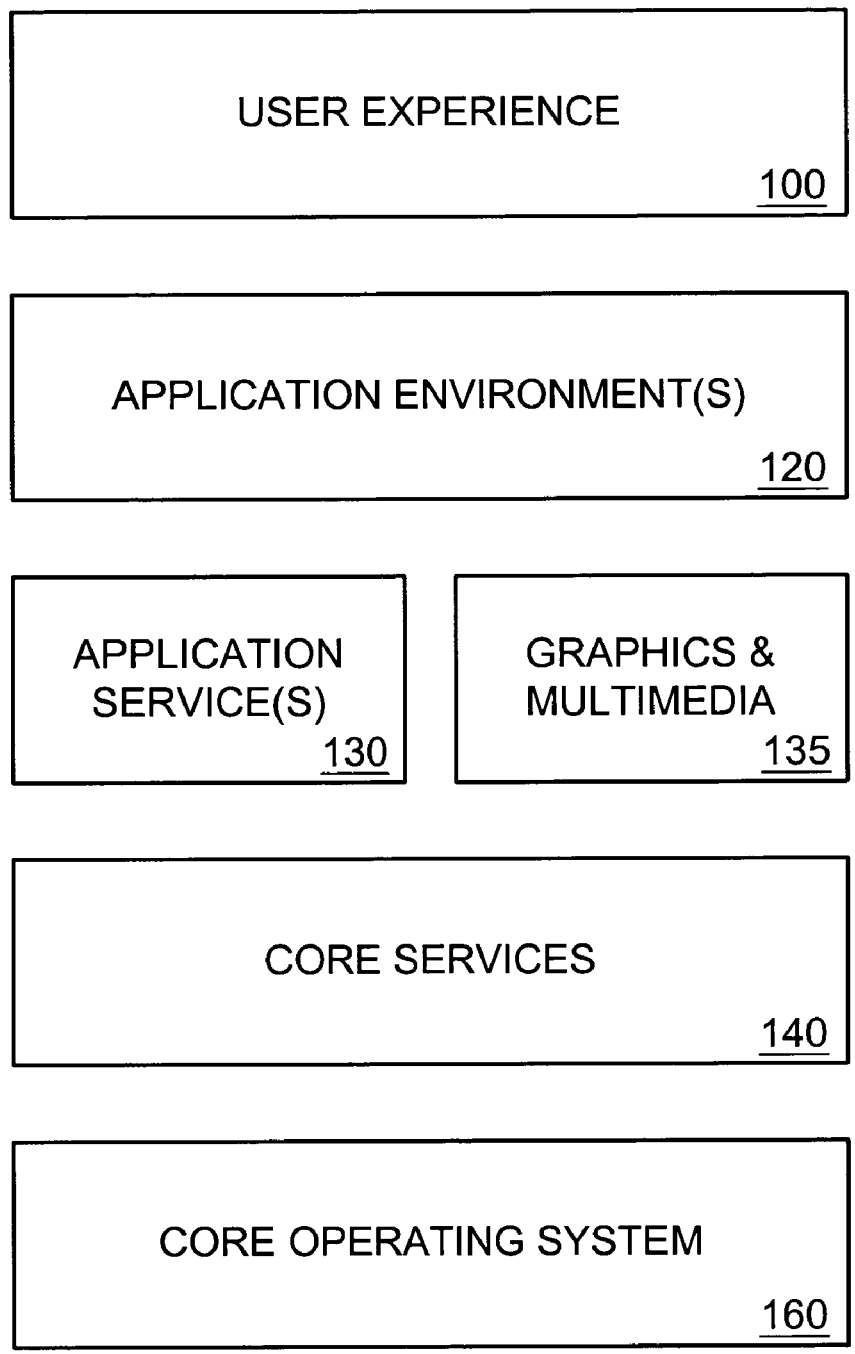
FIG. 1 illustrates conceptual layers of one embodiment of the Macintosh® OS X architecture.

In the following description, numerous specific details are set forth. However, embodiments of the invention may be practiced without these specific details. In other instances, well-known circuits, structures and techniques have not been shown in detail in order not to obscure the understanding of this description.

Described herein are mechanisms to provide functionality that allows a computer system (or other electronic device) to automatically utilize an appropriate network connection (e.g., VPN, PPP) when an application requests access to a network resource. In one embodiment, the appropriate network connection is determined based on contextual information provided by the application. For example, using a point-to-point protocol (PPP) connection (e.g., modem, PPPoE), typing a Universal Resource Locator (URL) in a Web browser should result in an automatic network connection.

For a Virtual Private Network (VPN) connection, the selection of network connection may be more complex. For example, typing a public URL (e.g., www.apple.com) may not result in utilization of a VPN connection, while typing a private URL (e.g., private.apple.com) may result in utilization of a VPN connection for authorized users. Utilization of the VPN connection for the public URL would result in authentication steps that may be distracting to a user or unnecessarily time consuming.

One mechanism for providing a network connection on demand is to provide a PPP connection each time an application attempts to send traffic to the network. When traffic arrives at the PPP networking layer, the system may not have enough information related to the context of the request in order to trigger the appropriate network connection. As a default, the system may attempt a connection for any traffic request. This is illustrated in the following example using an electronic mail application (hereinafter "mail application" for brevity).

A typical mail application may attempt to fetch new electronic mail in response to an explicit user request or as a background operation that occurs at predetermined time intervals. Fetching new electronic mail may include resolving a mail server address and making contact with the server. When such network traffic arrives in the networking stack, there is no way to effectively distinguish between a background fetch and a user initiated fetch. Both may be considered an application request that triggers a network connection. However, from a user perspective, these two functions are very distinct.

For the background fetch operation, the user may not be aware of the initiation of the fetch operation. The user may not be available to enter a password, if necessary. For the user initiated fetch operation, the user generally expects the fetch operation to occur. In addition when the application attempts a background fetch operation, the user may cancel the attempt. However, canceling one background fetch operation may not function to cancel subsequent background fetch operations. These subsequent background fetch operations may be distracting to the user.

An alternative mechanism may be to enable applications to provide contextual information along with a network access request. The contextual information may be used by system level components to determine what type of network connection should be triggered, if any. In this mechanism, the application is not required to determine the type of network connection to be triggered and the call may be made synchronously or asynchronously. The contextual information may be any type of contextual information, for example a flag indicating "connection mandatory" or "connection optional," or may be more complex. Thus, the applications making the network calls are not required to include evaluation capability to determine the type of network connection to be triggered.

The mechanisms described herein are generally described with respect to the Macintosh® OS X environment; however, these mechanisms may also be applied to other operating systems, for example, Windows®, UNIX or LINUX. By way of background, the Mac OS X environment may be conceptualized by the layers illustrated in FIG. 1. User experience layer 100 is an abstraction for methodologies for creating applications. Each methodology may be a set of guidelines and/of recommended technologies. Other operating systems may have similar conceptual layers.

Application environments layer 120 represents basic technologies for building applications. Application environment layer 120 may provide tools to developers for developing applications. Graphics and multimedia layer 135 may provide services for rendering two-dimensional and/or three-dimensional graphics, audio and/or video outputs. Application services layer 130 may provide features suited for applications rather than other types of software, for example, HTML rendering, font management, speech recognition, etc.

Core services layer 140 may implement low-level features that may be used by most types of software, for example, data formatting, memory management, process management, and/or low-level network communications. In one embodiment, many of the features of core services layer 140 may be included in the Core Foundation layer, which may be composed of several frameworks within OSX of Apple Computer. Alternatively, in a Windows® operating system environment, similar functionality may be provided by sockets, which are known in the art. Core OS layer 160 may include the kernel, device drivers and/or low-level commands of the operating system environment.

In general, the Core Foundation framework enables sharing of code and data among various frameworks and libraries and may enable some degree of operating system independence. In one embodiment the Core Foundation framework may provide common APIs and other structures including, for example, a plug-in architecture, XML property lists and/or preferences.

In one embodiment, the Core Foundation framework may include a network connection API that allows an application to trigger a network connection. In one embodiment, the Core Foundation framework may send network traffic to available network connections and may not trigger a new network connection (e.g., a VPN connection). Thus, the Core Foundation framework may use a network connection that is not appropriate for the conditions.

Core operating system 160 may include system level functionality. That is core operating system 160 may provide control and access to system level hardware components, for example, network interfaces. Core operating system 160 may initiate, terminate and/or otherwise control network connections using one or more network protocols. Thus, in order for an application to gain access to a network resource, interaction of multiple layers of an operating system environment may be required.

Figure 2:
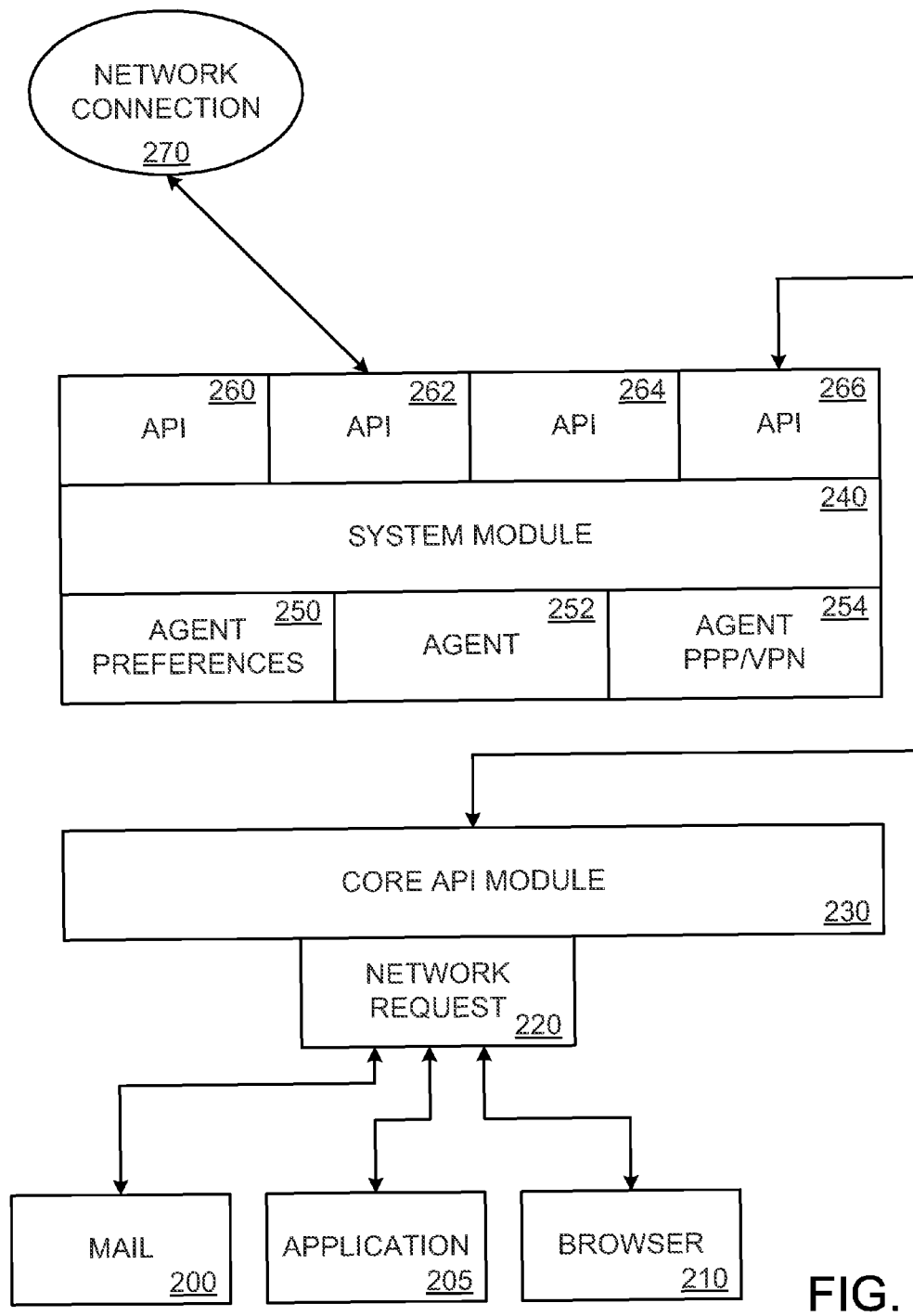
FIG. 2 is a block diagram of one embodiment of an application programming interface mechanism to support network connections based on contextual information.

FIG. 2 is a block diagram of one embodiment of an application programming interface (API) mechanism to support network connections based on contextual information. The example of FIG. 2 illustrates a two-part API mechanism to provide dynamically configurable connections on demand based on contextual information. Other mechanisms may also be provided using contextual information as described herein.

The API mechanism illustrated in FIG. 2 may provide dynamic network (e.g., PPP, VPN) connections based on contextual information to provide network connections that are appropriate for current system conditions. For example, network connections may not be allowed for applications checking for updates under certain conditions, or a VPN connection may be triggered only for private URLs and/or user-initiated electronic mail fetch operations.

In one embodiment, a software component that requests a network connection may make a call to network API 220. The software components may be, for example, an electronic mail application (mail 200) a Web browser (browser 210) or any other type of application (application 205). In one embodiment, network API 220 is a component of the Core Foundation framework or comparable system components (e.g., Sockets in a Windows® operating system environment), which are generally referred to herein as core API module 230. Core API module 230 may include other APIs or agents to provide additional functionality.

In one embodiment, a function call to network API 220 may include contextual information that may be used to determine characteristics of the network access in order to be used. For example, mail 200 may indicate whether the network connection is to be used for a background mail fetch or for a user initiated mail fetch. As another example, browser 210 may indicate whether a URL is entered or clicked by a user, or whether the URL is presented as part of an automatic refresh of a page. Other contextual information may also be provided by mail 200, application 205 and/or browser 210.

In one embodiment, core API module 230 interacts with system module 240 to access network connection 270. In one embodiment system module 240 may include multiple APIs (e.g., 260, 262, 264, 266) to interact with other system components and modules to provide desired functionality. In one embodiment, system module 240 may include agent preferences 250, agent 252 and PPP/VPN agent 254 as well as additional and/or different agents and related components.

In one embodiment, system module 240 includes functionality to analyze the contextual information received from core API module 230 to determine appropriate characteristics for the network connection to be used. For example, if a VPN connection is to be used to fetch e-mail, the fetch operation may only be performed for user initiated mail fetch operations. If a LAN connection is to be used to fetch e-mail, the fetch operation may be used for background as well as user initiated fetch operations. As another example, if a computer being used is not connected to a "home" network, a PPP connection may be used for public URLs and a VPN connection may be used for private URLs. When the computer is connected to the home network, both public and private URLs may be available via the LAN connection.

Figure 3:
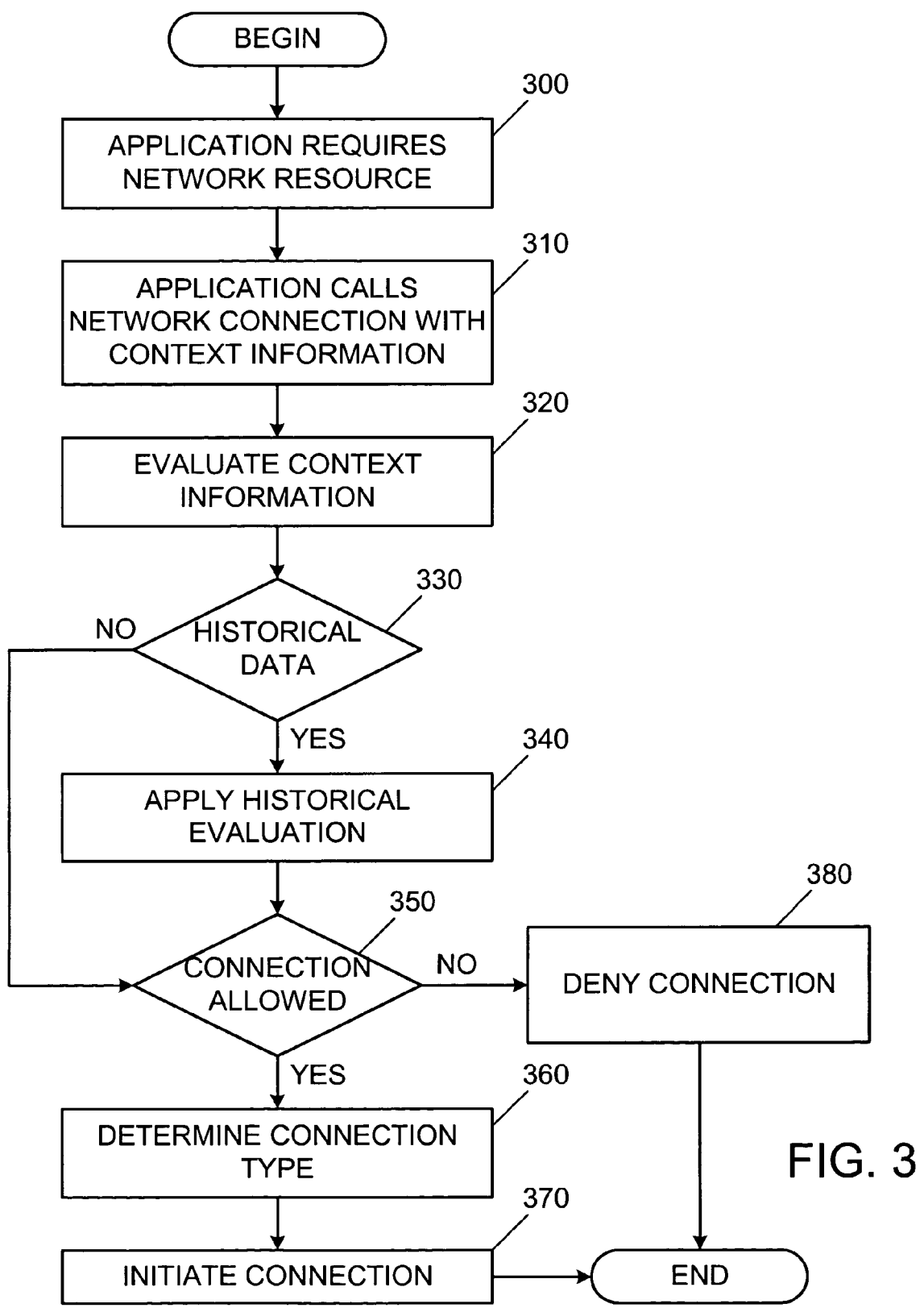
FIG. 3 is a flow diagram of one embodiment of dynamic network connections based on contextual information.

FIG. 3 is a flow diagram of one embodiment of dynamic network connections based on contextual information. As described above, the techniques and mechanisms for dynamically configurable network connections on demand may be applied to any application running on an electronic system. For reasons of simplicity, a single example using an electronic mail application will be used with respect to FIG. 3.

During execution, an application may require a network resource, 300. The electronic device running the application may be coupled with the network resource via a local area network, a PPP connection, a VPN connection, etc. The connection may be wired or wireless.

In one embodiment, the application may call for access to the network resource with contextual information, 310. The application may call for network access by performing a call to an API that supports network connections. The call my be followed by additional calls to other APIs. In one embodiment, the application provides to the API contextual information that is related to the network access.

The contextual information may include any type and/or amount of contextual information. Using the example of an electronic mail program the contextual information may be a bit that indicates whether the network access is a background mail fetch operation or if the network access is a user initiated mail fetch operation. Other contextual information may include, for example, multiple bits, a priority, a status, a network connection type (e.g., a VPN connection, a modem connection, a PPP connection).

The contextual information may be evaluated to determine the appropriate network connection to be used, 320. In one embodiment, the contextual information is passed from the application to the Core Foundation framework and then from the Core Foundation framework to the system module as described above. In such an embodiment, the system module may perform the evaluation of the contextual information to determine the appropriate network connection.

In one embodiment, the system module may use system status or characteristics in evaluating the contextual information. For example, location and/or connection information (e.g., work, home, remote) may be used with the contextual information in evaluating the network connection to be used. For example, if a user is at a work location coupled with a secure network, all mail fetch requests, whether background or user initiated, may be honored using the same local area network connection. When the user is in a different location, the evaluation of the contextual information may result in a different network connection being used.

In one embodiment, historical data may be used in evaluation of the contextual information, 330. The historical data may include, for example, previous actions by a user. For example, if a user has previously manually canceled a network connection attempt for a background mail fetch operation, the system module may not initiate a network connection under the same or similar conditions.

The evaluation using the historical data may be applied 340. Whether or not historical data is used, a network connection may be allowed or not allowed, 350, based on the evaluation of the system module (and/or other components or agents). If the network connection is not allowed, 350, the connection is denied, 380.

If the network connection is allowed, 350, the system module may determine the connection type, 360. The connection type may include, for example, PPP, modem or VPN connections. The appropriate connection type is initiated, 370. When the network connection is accomplished the application may access the requested network resource.

Figure 4:
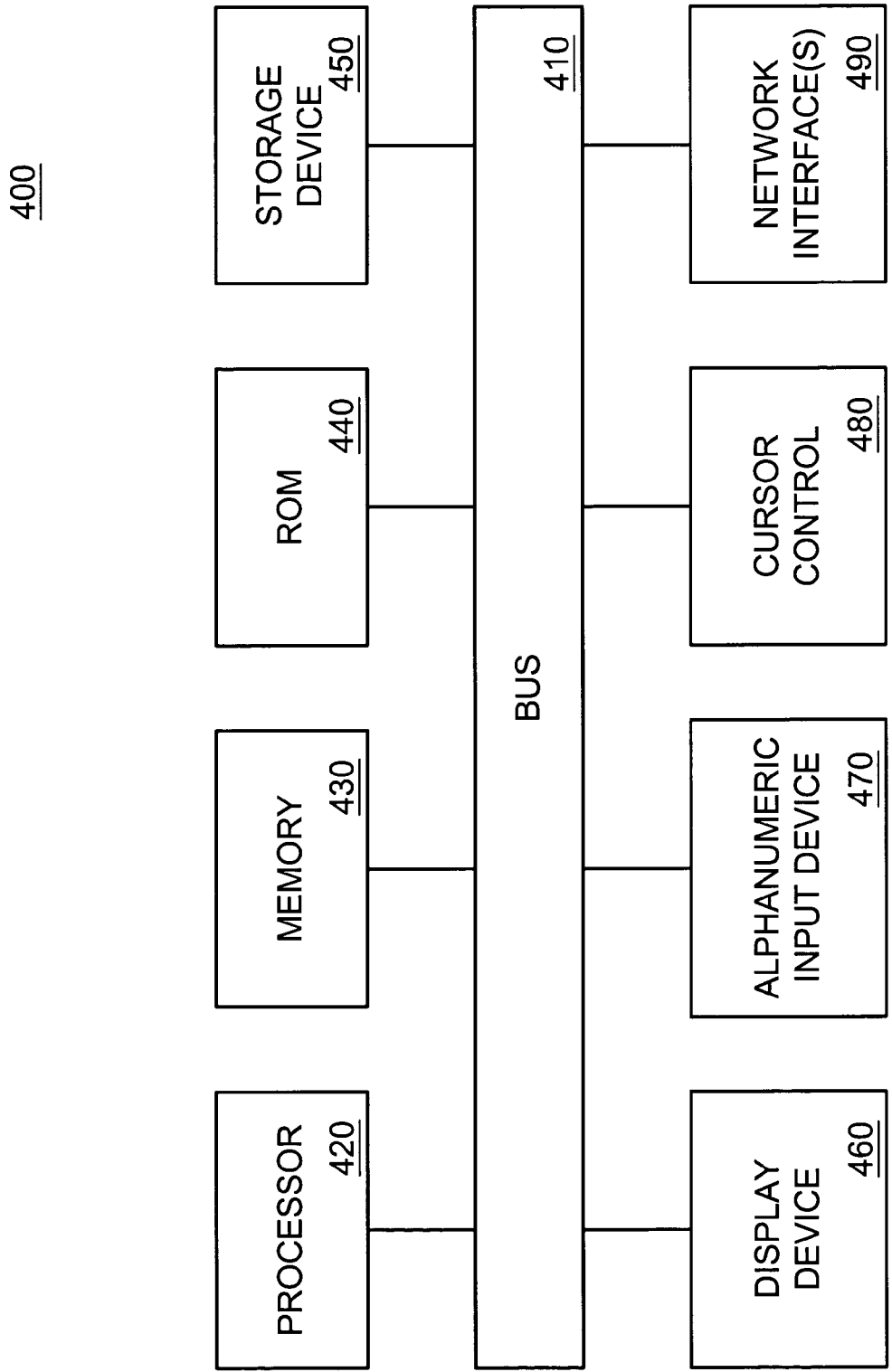
FIG. 4 is a block diagram of an electronic device.

In one embodiment, the techniques described herein may be implemented as instructions that may be executed by an electronic system. The electronic device may store the instructions and/or receive by the instructions (e.g., via a network connection). FIG. 4 is a block diagram of one embodiment of an electronic system. The electronic system illustrated in FIG. 4 is intended to represent a range of electronic systems, for example, computer systems, network access devices, etc. Alternative systems, whether electronic or non-electronic, can include more, fewer and/or different components.

Electronic system 400 includes bus 410 or other communication device to communicate information, and processor 420 coupled to bus 410 to process information. While electronic system 400 is illustrated with a single processor, electronic system 400 can include multiple processors and/or co-processors. Electronic system 400 further includes random access memory (RAM) or other dynamic storage device 430 (referred to as memory), coupled to bus 410 to store information and instructions to be executed by processor 420. Memory 430 also can be used to store temporary variables or other intermediate information during execution of instructions by processor 420.

Electronic system 400 also includes read only memory (ROM) and/or other static storage device 440 coupled to bus 410 to store static information and instructions for processor 420. Data storage device 450 is coupled to bus 410 to store information and instructions. Data storage device 450 such as a magnetic disk or optical disc and corresponding drive can be coupled to electronic system 400.

Electronic system 400 can also be coupled via bus 410 to display device 460, such as a cathode ray tube (CRT) or liquid crystal display (LCD), to display information to a user. Alphanumeric input device 470, including alphanumeric and other keys, is typically coupled to bus 410 to communicate information and command selections to processor 420. Another type of user input device is cursor control 480, such as a mouse, a trackball, or cursor direction keys to communicate direction information and command selections to processor 420 and to control cursor movement on display 460. Electronic system 400 further includes network interface 490 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 490) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method, comprising:

receiving, using one or more processing units, a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;

using, using the one or more processing units, the system module to analyze the information specific to the software component action under current system conditions including system status data, system characteristic data, and historical data, wherein the analysis is used to determine whether a dynamically configurable network connection may be allowed; and making, using the one or more processing units, a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is a VPN connection and the software component is an electronic mail application, then a fetch operation is only performed when manually requested.

2. The method of claim 1, wherein when the dynamically configurable network connection is a LAN connection and the software component is an electronic mail application, then a fetch operation is performed for background operations and manual operations.

3. The method of claim 1, wherein when the dynamically configurable network connection is not for a home network, a PPP network connection is used for public URLs and a VPN network connection is used for private URLs.

4. The method of claim 1, wherein when the dynamically configurable network connection is for a home network, a LAN network connection is used for public URLs and private URLs.

5. The method of claim 1, wherein the software component does not determine the connection type.

6. The method of claim 1, wherein the software component uses the dynamically configurable network connection to access a network resource.

7. A computer-program product, tangibly embodied in a machine-readable and non-transitory storage medium, including instructions configured to cause a data processing apparatus to:

receive a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;

use the system module to analyze the information specific to the software component action under current system conditions including system status data, system characteristic data, and historical data, wherein the analysis is used to determine whether a dynamically configurable network connection may be allowed; and make a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is a VPN connection and the software component is an electronic mail application, then a fetch operation is only performed when manually requested.

8. The computer-program product of claim 7, wherein when the dynamically configurable network connection is a LAN connection and the software component is an electronic mail application, then a fetch operation is performed for background operations and manual operations.

9. The computer-program product of claim 7, wherein when the dynamically configurable network connection is not for a home network, a PPP network connection is used for public URLs and a VPN network connection is used for private URLs.

10. The computer-program product of claim 7, wherein when the dynamically configurable network connection is for a home network, a LAN network connection is used for public URLs and private URLs.

11. The computer-program product of claim 7, wherein the software component does not determine the connection type.

12. The computer-program product of claim 7, wherein the software component uses the dynamically configurable network connection to access a network resource.

13. A method, comprising:

receiving, using one or more processing units, a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;

using, using the one or more processing units, the system module to analyze the information specific to the software component action under current system conditions including system status data, system characteristic data, and historical data, wherein the analysis is used to determine whether a dynamically configurable network connection may be allowed; and making, using the one or more processing units, a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is a LAN connection and the software component is an electronic mail application, then a fetch operation is performed for background operations and manual operations.

14. The method of claim 13, wherein when the dynamically configurable network connection is a VPN connection and the software component is an electronic mail application, then a fetch operation is only performed when manually requested.

15. The method of claim 13, wherein when the dynamically configurable network connection is not for a home network, a PPP network connection is used for public URLs and a VPN network connection is used for private URLs.

16. The method of claim 13, wherein when the dynamically configurable network connection is for a home network, a LAN network connection is used for public URLs and private URLs.

17. The method of claim 13, wherein the software component does not determine the connection type.

18. The method of claim 13, wherein the software component uses the dynamically configurable network connection to access a network resource.

19. A computer-program product, tangibly embodied in a machine-readable and non-transitory storage medium, including instructions configured to cause a data processing apparatus to:
- receive a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;
- use the system module to analyze the information specific to the software component action under current system conditions including system status data, system characteristic data, and historical data, wherein the analysis is used to determine whether a dynamically configurable network connection may be allowed; and
- make a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is a LAN connection and the software component is an electronic mail application, then a fetch operation is performed for background operations and manual operations.

20. The computer-program product of claim 19, wherein when the dynamically configurable network connection is a VPN connection and the software component is an electronic mail application, then a fetch operation is only performed when manually requested.

21. The computer-program product of claim 19, wherein when the dynamically configurable network connection is not for a home network, a PPP network connection is used for public URLs and a VPN network connection is used for private URLs.

22. The computer-program product of claim 19, wherein when the dynamically configurable network connection is for a home network, a LAN network connection is used for public URLs and private URLs.

23. The computer-program product of claim 19, wherein the software component does not determine the connection type.

24. The computer-program product of claim 19, wherein the software component uses the dynamically configurable network connection to access a network resource.

25. A method, comprising:
- receiving, using one or more processing units, a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;
- using, using the one or more processing units, the system module to analyze the information specific to the software component action under current system conditions including system status data, system characteristic data, and historical data, wherein the analysis is used to determine whether a dynamically configurable network connection may be allowed; and
- making, using the one or more processing units, a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is not for a home network, a PPP network connection is used for public URLs and a VPN network connection is used for private URLs.

26. The method of claim 25, wherein when the dynamically configurable network connection is a LAN connection and the software component is an electronic mail application, then a fetch operation is performed for background operations and manual operations.

27. The method of claim 25, wherein when the dynamically configurable network connection is a VPN connection and the software component is an electronic mail application, then a fetch operation is only performed when manually requested.

28. The method of claim 25, wherein when the dynamically configurable network connection is for a home network, a LAN network connection is used for public URLs and private URLs.

29. The method of claim 25, wherein the software component does not determine the connection type.

30. The method of claim 25, wherein the software component uses the dynamically configurable network connection to access a network resource.

31. A computer-program product, tangibly embodied in a machine-readable and non-transitory storage medium, including instructions configured to cause a data processing apparatus to:
- receive a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;
- use the system module to analyze the information specific to the software component action under current system conditions including system status data, system characteristic data, and historical data, wherein the analysis is used to determine whether a dynamically configurable network connection may be allowed; and
- make a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is not for a home network, a PPP network connection is used for public URLs and a VPN network connection is used for private URLs.

32. The computer-program product of claim 31, wherein when the dynamically configurable network connection is a LAN connection and the software component is an electronic mail application, then a fetch operation is performed for background operations and manual operations.

33. The computer-program product of claim 31, wherein when the dynamically configurable network connection is a VPN connection and the software component is an electronic mail application, then a fetch operation is only performed when manually requested.

34. The computer-program product of claim 31, wherein when the dynamically configurable network connection is for a home network, a LAN network connection is used for public URLs and private URLs.

35. The computer-program product of claim 31, wherein the software component does not determine the connection type.

36. The computer-program product of claim 31, wherein the software component uses the dynamically configurable network connection to access a network resource.

37. A method, comprising:
receiving, using one or more processing units, a request for a dynamically configured network connection at a core module, wherein the request is initiated by a software component action that requires network access, wherein a software component accesses the network using a network access operation selected from one or more network access operations specific to that software component, wherein the request includes information specific to the software component action including a selected network access operation, wherein the core module transmits the request to a system module, and wherein the software component, the core module, and the system module are within a single computing system;

using, using the one or more processing units, the system module to analyze the information specific to the software component action under current system conditions including system status data, system characteristic data, and historical data, wherein the analysis is used to determine whether a dynamically configurable network connection may be allowed; and making, using the one or more processing units, a determination whether to allow a dynamically configurable network connection, wherein when a dynamically configurable network connection is allowed, the system module uses the analysis to automatically determine a connection type, the connection type is initiated, and the dynamically configurable network connection is available to the software component, and wherein when the dynamically configurable network connection is for a home network, a LAN network connection is used for public URLs and private URLs.

38. The method of claim 37, wherein when the dynamically configurable network connection is a LAN connection and the software component is an electronic mail application, then a fetch operation is performed for background operations and manual operations.

39. The method of claim 37, wherein when the dynamically configurable network connection is not for a home network, a PPP network connection is used for public URLs and a VPN network connection is used for private URLs.

40. The method of claim 37, wherein when the dynamically configurable network connection is a VPN connection and the software component is an electronic mail application, then a fetch operation is only performed when manually requested.

41. The method of claim 37, wherein the software component does not determine the connection type.

42. The method of claim 37, wherein the software component uses the dynamically configurable network connection to access a network resource.

* * * * *